United States Patent Office 3,515,757
Patented June 2, 1970

3,515,757
ORGANIC COMPOUNDS AND PROCESSES
John W. Sibert, Birmingham, Mich., assignor to Ethyl Corporation, New York, N.Y., a corporation of Virginia
No Drawing. Filed Apr. 1, 1966, Ser. No. 539,300
Int. Cl. C07c 45/08
U.S. Cl. 260—604    5 Claims

ABSTRACT OF THE DISCLOSURE

A rhodium complex such as hydridocarbonylbis(triphenylphosphine)dichlororhodium is described. A process for preparing aldehydes from olefins, carbon monoxide and hydrogen utilizing said rhodium complex as a homogeneous catalyst, is also described.

This invention relates to new rhodium complex compounds and their use as catalysts in a homogeneous hydroformylation process.

Hydroformylation is a process whereby an unsaturated hydrocarbon is reacted with carbon monoxide and hydrogen in the presence of a suitable catalyst to produce an aldehyde or alcohol. This process is commonly called the oxo process. The reaction is generally carried out in a liquid medium which is also a solvent for the particular catalyst employed. This type of catalysis, that is, where the catalyst is soluble in the reaction system, is referred to as homogeneous catalysis.

The catalysts which are commonly used for homogeneous hydroformylation are complexes of certain transition metal carbon monoxide complex compounds. A well known and widely used complex of this type is cobalt octacarbonyl. Although it is used extensively in commercial oxo processes, cobalt has an undesirable characteristic; it is relatively unstable. Because of this instability, hydroformylation, using this cobalt compound, must be carried out under high pressures (100–300 atmospheres) and at relatively low temperatures (50° to 100° C.). The high pressures tend to minimize decomposition of the cobalt octacarbonyl. Hydroformylation at temperatures above about 150° C., for example, is generally avoided because of the exceedingly high pressures required.

It is apparent therefore that a soluble oxo catalyst of increased stability would prove to be a valuable contribution to this art. The present invention provides such a catalyst.

It is an object of this invention to provide new rhodium complex compounds. It is a further object of this invention to provide hydroformylation processes utilizing the rhodium complex compounds as homogeneous catalysts. These and other objects of this invention will be evident in the description and claims which follow.

An embodiment of this invention is a rhodium complex having the formula $$RhHX_2(CO)(L_1L_2L_3T)_2 \quad (I)$$

wherein (a) X is a halogen having an atomic number of 17 and higher, (b) $L_1$, $L_2$ and $L_3$ are independently selected from the group consisting of hydrogen, aryl radicals having 6 to 12 carbon atoms, alkaryl radicals having 7 to 12 carbon atoms and alkyl radicals having 1 to 12 carbon atoms and (c) T is an element selected from the group consisting of phosphorus, arsenic and antimony.

Examples of compounds of this invention having Formula I are hydridocarbonylbis(phenylphosphine)diiodorhodium
hydridocarbonylbis(ethyl-di-n-pentylphosphine)dichlororhodium
hydridocarbonylbis(phenyldiethylarsine)diiodorhodium
hydridocarbonylbis(phenyldibenzylstibine)dibromorhodium
hydridocarbonylbis(tri-n-decylarsine)dichlororhodium
hydridocarbonylbis(isopropylstibine)dibromorhodium
hydridocarbonylbis(α-naphthyl-4-hexylphenylarsine)diiodorhodium
hydridocarbonylbis(n-propylbiphenylyl-4-ethylphenylphosphine)dibromorhodium
hydridocarbonylbis(diisopropylphosphine)dibromorhodium and the like.

A characteristic feature of this complex is that the rhodium has an apparent valence of +3.

A preferred embodiment of this invention is a rhodium complex having Formula I wherein X and T are as defined above and $L_1$, $L_2$ and $L_3$ are independently selected from the group consisting of aryl radicals having 6 to 12 carbon atoms, alkaryl radicals having 7 to 12 carbon atoms and alkyl radicals having 2 to 12 carbon atoms.

Preferred rhodium complexes are hydridocarbonylbis(triphenylarsine)dichlororhodium
hydridocarbonylbis(dicresylphenylstibine)dibromorhodium
hydridocarbonylbis(diethyl-n-dodecylphosphine)dichlororhodium
hydridocarbonylbis(cresylethyl-2-ethyl-n-hexylarsine)dibromorhodium
hydridocarbonylbis(n-heptyldi-β-napthylphosphine)dibromorhodium
hydridocarbonylbis[di(4-n-hexylphenyl)-n-pentylstibine]dichlororhodium
hydridocarbonylbis(tribiphenylphosphine)dibromorhodium
hydridocarbonylbis[tri(4-isopropylphenyl)arsine]dichlororhodium and the like.

A more preferred embodiment of this invention is the rhodium complex having the formula $$RhHCl_2(CO)(L_1L_2L_3P)_2 \quad (II)$$

wherein $L_1$, $L_2$ and $L_3$ are independently selected from the group consisting of aryl radicals having 6 to 12 carbon atoms, alkaryl radicals having 7 to 12 carbon atoms and alkyl radicals having 1 to 12 carbon atoms. Rhodium complexes such as hydridocarbonylbis(dicresylbenezylphosphine)dichlororhodium
hydridocarbonylbis(n-hexydiphenylphosphine)dichlororhodium
hydridocarbonylbis(bipenhylyldi-n-dodecylphosphine)dichlororhodium
hydridocarbonylbis(tri-methylphosphine)dichlororhodium
hydridocarbonylbis(di-n-decylclohexylphosphine)dichlororhodium
hydridocarbonylbis(tri-n-butylphosphine)diodorhodium
hydridocarbonylbis(ethyl-n-pentyl-n-octylphosphine)dichlororhodium
hydridocarbonylbis(n-dodecyl-di-n-nonylphosphine)dibromorhodium
hydridocarbonylbis(tri-2-ethylhexylphosphine)dichlororhodium and the like are examples of this more preferred embodiment.

A more highly preferred embodiment of this invention is the rhodium complex having Formula II wherein $L_1$, $L_2$ and $L_3$ are independently selected from the group consisting of aryl radicals having 6 to 12 carbon atoms and alkaryl having 7 to 12 carbon atoms. Examples of these rhodium complex compounds are hydridocarbonylbis[di-(4-isopropylphenyl)phenylphosphene]dichlororhodium
hydridocarbonylbis(triindenylphosphine)dichlororhodium
hydridocarbonylbis(tricresylphosphine)dichlororhodium
hydridocarbonylbis(β-naphthyldiphenylphosphine)dichlororhodium and the like.

A most preferred rhodium complex is the compound having the formula

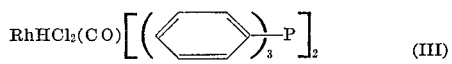

(III)

General methods of preparing various organometallic complexes are found in the literature. A convenient method of preparing the rhodium complexes of this invention is that described by Vaska, J. Am. Chem. Soc. 83, 2784 (1961). Vaska uses this method for preparing certain iridium complexes. Examples I and II which will follow shortly are illustrative of this particular procedure. It is possible however to prepare the rhodium complexes of this invention using other suitable procedures. The preparation of the rhodium complexes of this invention therefore is not limited to the procedure described in the examples.

Depending on the particular complex desired, the appropriate starting material is chosen which would contain the ligand desired. By ligand is meant the atom or group of atoms which is complexed with the rhodium atom. In the rhodium complexes of this invention one ligand, namely, CO is fixed. The variable ligand is the ($L_1L_2L_3T$) moiety illustrated in Formula I. Thus for example, if the hydridocarbonylbis(triethylphosphine)dibromorhodium was the desired reaction product, then the starting material used would correspond to the formula $$RhBr(CO)[(C_2H_5)_3P]_2 \qquad (IV)$$

The apparent valence of rhodium in this compound is +1. Another characteristic of the precursor rhodium compound is that it is stable at temperatures up to and including the reaction temperature. Following are examples illustrating the preparation of rhodium complexes of this invention. Parts are parts by weight unless otherwise indicated.

EXAMPLE 1

A suitable vessel having a stirrer, a gas inlet tube and a reflux condenser was charged with one part of carbonylbis(triphenylphosphine)rhodium in 105 parts of anhydrous diethyl ether. Anhydrous hydrogen chloride gas was then bubbled in slowly with stirring. The temperature of the reaction mixture rose to about 32° C. and the color of the solution gradually changed from bright yellow to off-white. This generally took place in about 30 minutes. The reaction mixture was then cooled to room temperature and a pale yellow product, $RhHCl_2(CO)(\phi_3P)_2$, precipitated. This precipitate was filtered off and dried. The yield of yellow $RhHCl_2(CO)(\phi_3P)_2$ was 95%. Identity of this compound was confirmed by infrared analysis. Infrared analysis showed this product to have $\nu_{max}^{KBr}$ cm.$^{-1}$ 1955 (vs.), 2025 (vs.) and 2105 (m.)

in addition to triphenylphosphine infrared absorption.

EXAMPLE 2

A suitable vessel equipped as in Example 1 is charged with 1 part of carbonylbis(tri-n-butylphosphine)bromorhodium in about 100 parts of anhydrous benzene. Anhydrous hydrogen bromide gas is then bubbled into the solution with stirring for about 30 minutes. The temperature of the mixture rises to about 50° C. At the end of this time, the reaction vessel is cooled to room temperature and the product, hydrocarbonylbis(tri-n-butylphosphine)dibromorhodium, precipitates. This precipitate is filtered off and dried.

Another embodiment of this invention is a hydroformylation process which comprises reacting an olefin having 2 through 24 carbon atoms with carbon monoxide and hydrogen under 2 to 2000 atmospheres pressure in the presence of a catalytic amount of the rhodium complex having Formula I wherein (a) X is a halogen having an atomic number of 17 and higher (b) $L_1$, $L_2$ and $L_3$ are independently selected from the group consisting of hydrogen, aryl radicals having 6 to 12 carbon atoms, alkaryl radicals having 7 to 12 carbon atoms and alkyl radicals having 2 to 12 carbon atoms and (c) T is an element selected from the group consisting of phosphorus, arsenic, and antimony.

A most preferred hydroformylation process is the preferred process described above wherein the rhodium complex used as a catalyst has Formula III.

In essence, the hydroformylation reaction involves the addition of carbon monoxide and hydrogen at the point of unsaturation in a suitably unsaturated compound. This reaction may be visualized as the addition of the elements of formaldehyde to the double bond, yielding an aldehyde containing one carbon atom more than the parent olefin. Thus, for example if hexene-1 is hydroformylated, the resulting product is primarily heptanal containing small amounts of other $C_7$ aldehyde isomers. The presence of the isomers is due to the fact that in the course of hydroformylation, some isomerization of the double bond occurs. Since this isomerization occurs to some extent in all hydroformylation reactions, the reaction products always will be mixtures of aldehyde isomers. If it is desired, these aldehydes may be separated by any suitable means, such as for example chromatographic separation.

Generally, any organic compound which contains a carbon to carbon double bond, that is an olefin, may be hydroformylated. Suitable olefins may have either single or multiple unsaturation. Compounds having one C to C double bond are commonly called monoolefins. This double bond in these monoolefins may be positioned anywhere in the molecule. Examples of useful monoolefins are ethylene, triisobutylene, decene-3, octene-4, cyclohexene, eicosene-4 and the like. The useful monoolefins also include substituted compounds such as allyl alcohol and the like.

Olefins exhibiting multiple unsaturation are those having two or more carbon to carbon double bonds in their structure. The position of these double bonds in the molecule may be conjugated or isolated. Olefins with conjugated double bonds which are suitable for use in the oxo process of this invention are compounds such as 1,3-butadiene, 1,3,5-hexatriene, 2-chloro-1,3-butadiene, 2-chloro-1,3-butadiene, 3,5-nonadecadiene, and the like. Useful olefins containing isolated double bonds are compounds such as 1,5-hexadiene, 1,5,8-dodecatriene, 2,6-octadecadiene and the ilke. A characteristic feature of olefins with two or more conjugated double bonds is that only one of the double bonds is hydroformylated. The remaining double bonds are hydrgenated. Thus, for example, when 1,3-butadiene is hydroformylated, the product obtained is a mixture of pentanal and its isomers rather than a dialdehyde.

Unsaturated organic compounds which are particularly preferred in this hydroformylation reaction are the monoolefins having 2 to 24 carbon atoms. These preferred monoolefins are further characterized in that the double bond is in the 1 or 2 position in the molecule. Thus, preferred olefins are exemplified by compounds such as 2-hexene, 1-decene, 1-octadecylene, 2-tetradecylene and the like.

The olefins which are especially preferred are monoolefins having 2 through 24 carbon atoms wherein the double bond is in the terminal position, that is in the one position. These olefins are especially useful in this process because the product obtained from them is primarily the normal aldehyde, containing only a small portion of branched aldehyde isomers. Examples of the more preferred olefins are 1-propene, 1-pentene, 1-undecene, 1-heptadecylene, 1-nonadecylene diisobutylene and the like.

The catalyst which is used in the hydroformylation process of this invention is a rhodium complex having Formula I. An outstanding feature of this catalyst is that it is stable at elevated temperatures, i.e., above about 120° C. This stabilization is attributed to the presence of the ($L_1L_2L_3T$) type ligand in the complex molecule. This increased stability permits the use of higher reaction temperatures during the hydroformylation. The use of these higher temperatures improves both the rate of reaction and the yield obtainable in the hydroformylation. Futhermore, this ligand makes the complex soluble in typical oxo reaction solvents. Thus, the catalyst effects a homogeneous rather than a heterogeneous catalysis.

The rhodium complexes which are suitable as catalysts are described and exemplified above in the disclosure relating to the complexes as new compounds. The preference of these rhodium complexes as compounds is the same as the preference of the complexes as catalysts in the hydroformylation process. For example, the rhodium compounds described as preferred above are also preferred catalysts. The most preferred rhodium compound as illustrated by Formula III above is by the same token the most preferred catalyst in the hydroformylation process.

The hydroformylation reaction of this invention is generally carried out in a liquid reaction medium. This liquid reaction medium is such that it should not interfere with the desired oxo reaction nor react with the products obtained therefrom. This liquid reaction medium furthermore is preferably a solvent for the catalyst and the unsaturated organic reactant. Examples of suitable media of this type are hydrocarbons such as benzene, toluene, decaline, decane and the like, and oxygenated organic compounds such as dimethyl carbitol, diisobutyl ketone and the like. Other organic media which meet the criteria set forth above can also be used.

The classical oxo reaction is generally carried out at temperatures near 50° C. The hydroformylation process of this invention can be carried out at temperatures from 40° to about 300° C. It is a feature of this process however that reaction temperatures above 145° C. can be used. A preferred temperature range for the present reaction is from about 140° C. to about 250° C.

This reaction can be carried out under pressures ranging anywhere from about 2 to about 2,000 atmospheres. It is preferred that pressures from 10 to about 2,000 atmospheres be used. Since the reactants, carbon monoxide and hydrogen, are gases under the conditions of this reaction, these gases can be ordinarily used to maintain the desired reaction pressure. If necessary, however, the pressure may be maintained by using other inert gases, such as nitrogen and the like.

Generally the time required to complete the reaction may be varied over a wide range. Reaction times from about 5 minutes to about 36 hours can be used. The reaction may be completed in from 5 minutes to about 18 hours. The time of reaction is, however, to a certain extent, a dependent variable. For example, as the temperature of the reaction is increased, the reaction time may be decreased. Furthermore, batch processes would normally allow for longer reaction times, whereas a continuous process would utilize a shorter reaction time. Optimum reaction time therefore can be adjusted above and below the limits set out above in order to meet the requirements in the type of process method utilized.

A molar ratio of $CO:H_2$ which should be maintained during the reaction is 1.5:1 to 1:5. It is preferred that the $CO:H_2$ ratio be in the range of from 1:1 to 1:3. By keeping the amount of hydrogen down to a reasonable minimum, hydrogenation of the unsaturated organic starting material is minimized. Reaction ratios of the CO and $H_2$ outside the ranges given can also be used. Carbon monoxide rich mixtures tend in some instances to reduce the rate of reaction.

The amount of catalyst which is used in the process of this invention may be varied from about 0.01% to about 15% by weight of the unsaturated organic reactant. A preferred catalyst range is 0.1% to about 7% by weight of the unsaturated organic compound.

The hydroformylation reaction can be carried out in a suitable vessel in which the required reaction pressures may be maintained. Typically, the reaction is carried out in an autoclave. After the solvent is placed in the autoclave, the unsaturated hydrocarbon and the catalysts are dissolved in it. The required amount of carbon monoxide and hydrogen is then introduced into the vessel, to an acceptable pressure level. The vessel is then heated to the desired reaction temperature and the reaction is allowed to proceed. When the reaction is complete, the vessel is allowed to cool. The product which is obtained as mentioned above is a mixture of aldehydes. This mixture of aldehydes is separated from the reaction solvent by some suitable means such as for example distilling under vacuum. Where the solvent has a lower boiling point than the aldehyde product, the solvent is removed during the distillation. The aldehydes and the catalyst residue remain in the vessel. The aldehydes are separated from the catalyst residue by filtration, generally. If, on the other hand, the aldehydes are removed during the final distillation, they are simply condensed. No separation from the catalyst residue is required. In either case the final product is a mixture of aldehyde isomers. This mixture of isomers is generally useful without any further separation. However, if a particular aldehyde is desired, this mixture of aldehydes can be separated by any suitable technique, such as fractional distillation. The quantity of branched aldehydes in the reaction products of this invention is very small. This is due to the aforementioned low isomerizing power of the novel catalyst system. In most cases separation of the aldehydes will not be necessary.

Following are examples of the hydroformylation process of this invention. Parts and percentages are by weight except where otherwise stated.

EXAMPLE 3

A suitable autoclave fitted with a magnetic stirrer was charged with 94 parts of $RhHCl_2(CO)(\phi_3P)_2$ (25 parts rhodium), 1620 parts of hexene-1 and 6400 parts of benzene. The autoclave was then sealed and pressurized to 500 p.s.i.g. with hydrogen and carbon monoxide in a mole ratio of 4 to 5. The autoclave was vented twice. It was then heated to 75° C. and pressurized to 1450 p.s.i.g. with hydrogen and carbon monoxide (4/5). The temperature was then increased to 150° C. and pressure rose to 1750 p.s.i.g. The reaction was allowed to proceed at this temperature for five hours. During this period, the pressure dropped from 1750 p.s.i.g. to 1220 p.s.i.g. At the end of this time, the autoclave was cooled to room temperature and vented. 7770 parts of a clear yellow solution were recovered from the autoclave. A vapor phase chromatographic analysis showed the solution to contain 15.1% of n-$C_7$ aldehyde, 6.1% branched-$C_7$ aldehyde, 2.3% of a mixture of hexene-2 and hexene-3, 2.0% hexene-1 and 0.1% of n-hexane with the remainder being the reaction solvent benzene.

EXAMPLE 4

A suitable autoclave fitted with a magnetic stirrer was charged with 94 parts of $RhHCl_2(CO)(\phi_3P)_2$ (25 parts rhodium), 1620 parts of hexene-2 and 6400 parts of benzene. The autoclave was sealed and pressurized to 500 p.s.i.g. with a 4:5 molar ratio mixture of hydrogen and carbon monoxide. The autoclave was vented twice. It was then heated to 75° C. and pressurized to 1450 p.s.i.g. with 4:5 hydrogen and carbon monoxide. The temperature was increased to 150° C. and the pressure rose to 1820 p.s.i.g. The reaction was continued at this temperature with stirring for 12 hours. At the end of this time, the autoclave was cooled to room temperature and vented. 7960 parts of a clear yellow solution was recovered from the autoclave. Analysis of this solution by vapor phase chromatographic analysis gave the following results; n-$C_7$ aldehydes, 3.8%; branched-$C_7$ aldehyde, 18.7%; mixed hexene-2 and hexene-3, 0.5%; hexene-1, 0.9% and n-hexane, 0.1%.

EXAMPLE 5

A suitable autoclave fitted with a magnetic stirrer is charged with 188 parts of hydridocarbonylbis(tricresylphosphine)dibromorhodium, 1880 parts of hexadecylene-1 and 6,000 parts of tetralin. The autoclave is sealed and pressurized to about 400 p.s.i.g. wtih a 1:1 molar ratio mixture of hydrogen and carbon monoxide. After venting the autoclave twice, it is then pressurized to about 2500 p.s.i.g. with 1:1 hydrogen and carbon monoxide. The reaction mixture is then heated to 250° C. and the reaction is allowed to continue with stirring at this temperature for six hours. The autoclave is then cooled to room temperature and vented. The product recovered from the autoclave is a tetralin solution of the mixed $C_{17}$ aldehydes with traces of hexadecane and hexadecylene. The aldehydes are separated from the solvent and catalyst residue by fractional distillation.

EXAMPLE 6

A suitable autoclave fitted with a magnetic stirrer is charged with 40 parts of hydridocarbonylbis(isobutyl-di-n-octadecylphosphine)dichlororhodium, 2,000 parts of decene-1 and 5,000 parts of toluene. After sealing the autoclave, it is pressurized with a 3:1 molar ratio mixture of hydrogen and carbon monoxide to about 400 p.s.i.g. The autoclave is vented twice and then it is pressurized to about 2,000 p.s.i.g. with the 3:1 mixture of hydrogen and carbon monoxide. This mixture is then heated to 200° C. and allowed to react at this temperature with stirring for two hours. The autoclave is then cooled to room temperature and vented. The product recovered from the autoclave is a toluene solution of mixed $C_{11}$ aldehydes with traces of decane and decene.

EXAMPLE 7

A suitable autoclave fitted with a magnetic stirrer is charged with 150 parts of hydridocarbonylbis(tri-n-butylphosphine)dibromorhodium, 1,000 parts of dodecylene-1 and 3,000 parts of 1,4-dioxane. The autoclave is sealed and pressurized to about 300 p.s.i.g. with a 1:1.5 molar ratio mixture of hydrogen and carbon monoxide. The autoclave is then vented 3 times; it is pressurized to about 1800 p.s.i.g. with the 1:1.5 hydrogen/carbon monoxide mixture. This reaction mixture is heated to 175° C. and the reaction is allowed to proceed with stirring at this temperature for eight hours. The autoclave is then cooled to room temperature and vented. The product which is recovered from the autoclave is the dioxane solution of the mixed $C_{13}$ aldehydes with traces of dodecane and decylene.

EXAMPLE 8

A suitable autoclave fitted with a magnetic stirrer is charged with three parts of hydridocarbonylbis(diphenylethylarsine)diiodorhodium, 1500 parts of pentadecylene-2 and 3,000 parts of methylethyl ketone. After sealing the autoclave, it is pressurized to about 500 p.s.i.g. with a 1:1.2 molar ratio mixture of hydrogen and carbon monoxide. The autoclave is vented twice and then is pressurized to about 750 p.s.i.g. with the same hydrogen/carbon monoxide mixture. The reaction mixture is then heated to about 220 C. and reaction is allowed to proceed with stirring at this temperature for 30 minutes. The autoclave is then cooled to room temperature and then vented. The product obtained from the autoclave is a methylethyl ketone solution of the mixed $C_{16}$ aldehydes with traces of pentadecane and pentadecylene.

EXAMPLE 9

A suitable autoclave fitted with a magnetic stirrer is charged with 84 parts of hydridocarbonylbis(dipentylcresylarsine)dibromorhodium, 1200 parts of cyclohexene and about 4,000 parts of octane. The autoclave is sealed and pressurized to about 500 p.s.i.g. with a 2:1 molar ratio mixture of hydrogen and carbon monoxide. After venting the autoclave twice, it is then pressurized to about 3,000 p.s.i.g. with the same hydrogen/carbon monoxide mixture. This reaction mixture is then heated to about 155° C. and the reaction allowed to continue with stiring at this temperature for three hours. After cooling the autoclave to room temperature, it is vented. The product recovered from the autoclave is an octane solution of cyclohexanal with traces of cyclohexane and cyclohexene.

EXAMPLE 10

A suitable autoclave fitted with a magnetic stirrer is charged with 25 parts of hydridocarbonylbis(di-tert-butylethylphosphine)dichlororhodium, 2,500 parts of heptadecylene-1 and 3,000 parts of Decalin. The autoclave is sealed and pressurized to about 400 p.s.i.g. with a 2.5:1.0 molar ratio mixture of hydrogen and carbon monoxide. After venting the autoclave twice, it is pressurized to about 1,000 p.s.i.g. with the same hydrogen/carbon monoxide mixture. This mixture is then heated to about 190° C. and the reaction is allowed to continue with stirring at this temperature for one and one-half hours. The autoclave is then cooled to room temperature and then vented. The product recovered from the autoclave is a Decalin solution of the mixed $C_{18}$ aldehydes with traces of heptadecane and heptadecylene.

EXAMPLE 11

A suitable autoclave fitted with a magnetic stirrer is charged with 72 parts of hydridocarbonylbis(cyclohexyl-di-n-octyl-phosphine)dibromorhodium, 1800 parts of a mixture of heptene-1 and heptene-2, and 4800 parts of di-n-butylether. The autoclave is sealed and pressurized to about 450 p.s.i.g. with a 1:1.1 molar ratio mixture of hydrogen and carbon monoxide. After venting the autoclave twice, it is then pressurized to about 1500 p.s.i.g. with the same hydrogen/carbon monoxide mixture. The reaction mixture is then heated to about 175° C. and the reaction is allowed to continue with stirring at this temperature for two hours. The autoclave is cooled to room temperature and vented. The product recovered from the autoclave is the di-n-butylether solution of the mixed $C_8$ aldehyde with traces of heptane and heptene.

The aldehyde products of the hydroformylation process have myriad uses. They are principally useful as intermediates in the preparation of acids, alcohols, detergents, plasticizers, antioxidants, accelerators, resins and the like.

The disclosure and examples above clearly describe novel rhodium complexes and novel hydroformylation processes utilizing these rhodium complexes as catalysts. An outstanding feature of these rhodium compounds as catalysts is that they effect homogeneous catalysis and are stable enough to permit the reaction to be carried out at relatively high temperatures.

The foregoing disclosure describes the invention with particularity. The scope of the invention is however, to be limited only to the extent of the claims which follow.

I claim:
1. A hydroformylation process for preparing aldehydes which comprises reacting an olefin having 2 through 24 carbon atoms with carbon monoxide and hydrogen under

2 to 2,000 atmospheres pressure at temperatures of from about 140° C. to about 250° C. in the presence of a catalytic amount of the rhodium complex having the formula $$RhHX_2(CO)(L_1L_2L_3T)_2$$

wherein (a) X is a halogen having an atomic number of 17 and higher, (b) $L_1$, $L_2$ and $L_3$ are independently selected from the group consisting of hydrogen, aryl radicals having 6 to 12 carbon atoms, alkaryl radicals having 7 to 12 carbon atoms and alkyl radicals having 1 to 12 carbon atoms and (c) T is an element selected from the group consisting of phosphorus, arsenic and antimony.

2. The hydroformylation process of claim 1 wherein said olefin is a monoolefin and wherein said rhodium complex has the formula $$RhHCl_2(CO)(L_1L_2L_3P)_2$$

wherein $L_1$, $L_2$ and $L_3$ are as defined in claim 1.

3. The hydroformylation process of claim 2 wherein said rhodium complex has the formula

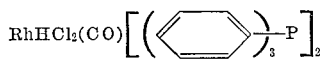

4. The hydroformylation process of claim 3 wherein said pressure is from about 70 to about 200 atmospheres.

5. A hydroformylation process of claim 4 wherein said olefin is hexene and said reaction temperature is about 150° C. and said reaction pressure is from about 100 to about 125 atmospheres.

References Cited

UNITED STATES PATENTS

| | | | |
|---|---|---|---|
| 3,239,566 | 3/1966 | Slaugh et al. | 260—604 |
| 3,102,899 | 8/1963 | Canne | 260—604 X |

OTHER REFERENCES

Chatt et al.: Chemistry and Industry, 290, March 191.

Osborn et al.: Chemical Communications, No. 2, January 1965, page 17.

Baird et al.: Chemical Communications, No. 5, March 1966, pp. 129–130.

Vaska et al.: Journ. Amer. Chem. Soc., vol. 83, 2784–2785, 1961.

Evans et al.: Nature, vol. 208, 1203–1204, 1965.

LEON ZITVER, Primary Examiner

R. H. LILES, Assistant Examiner

U.S. Cl. X.R.

252—431; 260—598, 429